T. E. MURRAY & H. R. WOODROW.
METHOD OF MAKING HOLLOW METAL OBJECTS BY ELECTRICAL WELDING.
APPLICATION FILED JAN. 24, 1917.
1,223,091. Patented Apr. 17, 1917.
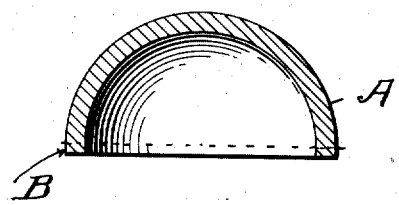
Fig. 1.
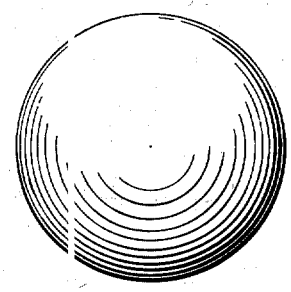
Fig. 2.
Fig. 3.
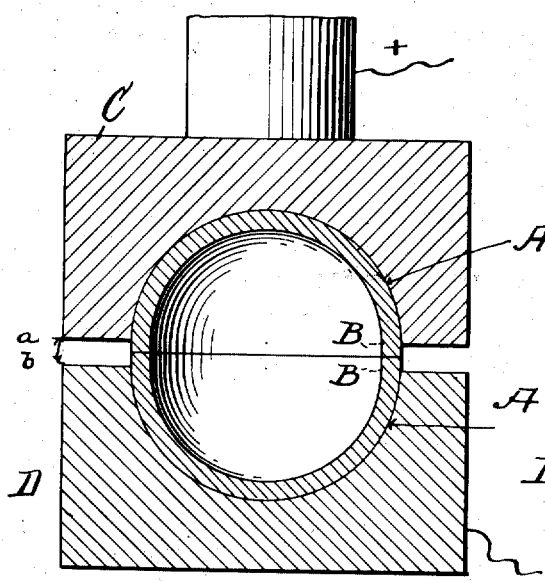
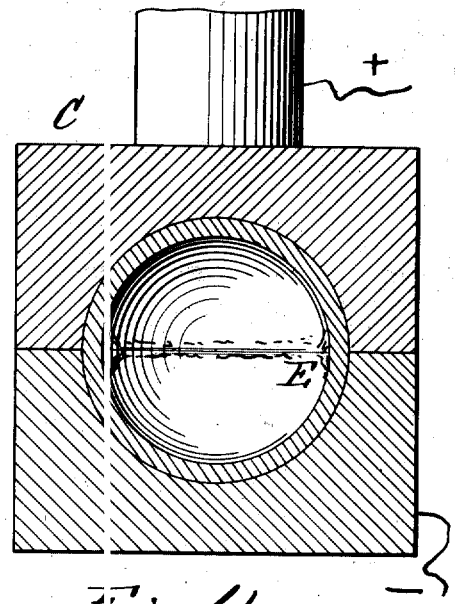
Fig. 4.
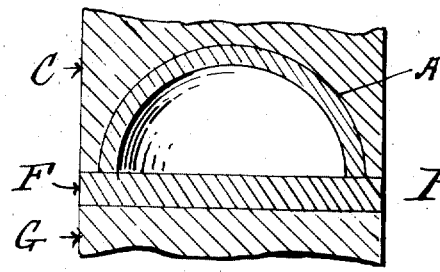
Fig. 5.
INVENTORS
Thomas E. Murray
Harry R. Woodrow
BY
Carl Benjamin
their ATTORNEY

UNITED STATES PATENT OFFICE.

THOMAS E. MURRAY AND HARRY R. WOODROW, OF NEW YORK, N. Y.; SAID WOODROW ASSIGNOR TO SAID MURRAY.

METHOD OF MAKING HOLLOW METAL OBJECTS BY ELECTRICAL WELDING.

1,223,091.      Specification of Letters Patent.      Patented Apr. 17, 1917.

Application filed January 24, 1917. Serial No. 144,113.

*To all whom it may concern:*

Be it known that we, THOMAS E. MURRAY and HARRY R. WOODROW, citizens of the United States, residing at New York, in the county of New York and State of New York, have invented a certain new and useful Improvement in Method of Making Hollow Metal Objects by Electrical Welding, of which the following is a specification.

The invention is a method of making hollow metal objects by electrical welding.

In the accompanying drawings—

Figure 1 is a hemispherical shell. Fig. 2 is a spherical shell formed by uniting homogeneously two of such hemispherical shells. Fig. 3 shows two hemispherical shells as in Fig. 1, disposed in matrix electrodes prior to electrical welding. Fig. 4 shows the same after the welding is completed, and the spherical shell produced. Fig. 5 is a section similar to Fig. 4, showing a hemispherical shell welded to a flat plate.

Similar letters of reference indicate like parts.

We produce hollow objects by electrical welding in the following way—taking, for example, the simplest form, namely, a spherical shell, as shown in Fig. 2.

From a plate of sheet metal, we form by striking up, stamping or pressing, a hemispherical shell, Fig. 1. Said shell comprises a hemisphere A and an annular extension on the edge thereof, shown at B. In the flat faces of electrodes C and D, we form hemispherical matrices. Into these matrices, we place the two hemispherical shells A A' to be welded, with their edges registering, and in contact. The flat faces of the two electrodes C, D will then, as shown in Fig. 3, be separated by a distance $a$, $b$ equal to twice the depth of each annular extension B. We then press the electrodes together, while establishing the welding current. The metal of the extensions B, B will be fused, molecularly mingled, compressed or condensed, and to some extent extruded inwardly, as indicated at E, Fig. 4. The result is a sphere, as shown in Fig. 2. Instead of making a sphere, we may weld the hemispherical shell of Fig. 1 to a plate F, Fig. 5, supported upon a flat electrode G, so as to form a protuberance on said plate.

Attention is called to the following points:

(*a*) When a dish or cup-shaped, or, generally speaking, concavo-convex body, is simply set in an electrode having a correspondingly formed matrix, and pressed against either a flat surface, as in Fig. 5, or against the edge of another and similar body in a like matrix, as in Figs. 3 and 4, the seated body is self centering. That is to say, even if it is put in the matrix with its edge not parallel to the opposite welding surface, said edge, as soon as said body is pressed against said surface, of necessity becomes parallel, the body tilting or nutating in said matrix under the pressure. Where two bodies are seated in the matrices of opposite electrodes, even if their edges are not parallel, when said electrodes are pressed together, said edges become parallel, since said bodies tilt or nutate in the matrices, and under the pressure adjust their edges to one another. So far as we are aware, the electrical welding of bodies thus tiltably or nutatably seated in matrix electrodes is here disclosed for the first time.

(*b*) If the lished, cup-shaped or concavo-convex bodies on coming from the stamping press are in any wise deformed or warped, the matrix electrodes will correct the inaccuracy, because they are in themselves dies. They subject the portions of the objects seated in them to a second forcible shaping, this time not only under pressure, as in the stamping press, but under both pressure and the heat generated in the electrodes themselves and not merely at the edges of said bodies which protrude beyond the electrode surfaces, at which edges the welded joint is made. That heat is enough to soften the metal of the bodies within the matrices to a degree to compel each body to take the form of its matrix, and as the matrix is true, the resulting shape is true. So far as we are aware, the truing of previously stamped concavo-convex objects in matrix electrodes by pressure and by the heat which also makes the weld is here disclosed for the first time.

(*c*) Where two concavo-convex objects, each provided with an annular extension at its edge—as the annular portion B of the shell of Fig. 1—are subjected to both pressure and heat in a matrix electrode, these extensions furnish the metal for the "take up." As the flat faces of the electrodes come together, the tendency is to force the melted metal inward, and when said faces meet (Fig. 4) practically all of the metal that is extruded appears on the inside of and is, therefore, wholly concealed within the hollow object.

So far as we are aware, the making of hollow objects, and especially spherical shells, of homogeneous metal smooth on the exterior, by pressure and by heat electrically generated in their own substance, is here disclosed for the first time.

The number of shapes in which hollow objects of homogeneous metal can be made, as described, is indefinitely great. We limit ourselves herein to no particular shape. The uses to which such objects can be put are also very many. We limit ourselves to no particular use.

The specific thing—namely, a globe, sphere or ball—here illustrated as one embodiment of our invention can be applied to many uses, such as for marine buoys, gas receptacles, compressed air vessels, and projectiles. We have found that when such balls are made of tough steel and of suitable dimensions, they can be used in ball-bearings to replace the balls now turned or otherwise produced from solid metal. They resist crushing quite as well, are amply strong and far cheaper to manufacture.

We claim:

1. Electrically welding bodies seated in and free to tilt or nutate in matrix electrodes.

2. The method of shaping an object of sheet metal, which consists in, first, pressing, striking up or stamping said object into approximately a selected concavo, convex, dish or cup-shaped form; second, seating said object in an electrode having a matrix of the selected concavo, convex, dish or cup-shaped form, with the welding edge of said object protruding beyond said electrode; third, placing said edge in welding contact with a second object, and, fourth, pressing said objects together and establishing through said objects a welding current sufficient to heat said electrode, and thereby to soften the portion of said object seated in said matrix and to cause said softened portion to conform to the shape of said matrix.

3. The method of producing hollow metal objects substantially as herein set forth, which consists in, first, producing by stamping, striking up or pressing from sheet metal two half sections of the hollow object; second, placing said half sections in matrices formed in the faces of metal electrodes with the edges of said sections in registry; third, pressing said sections together, and at the same time establishing the welding current through said electrodes and sections, whereby said sections by the combined action of heat and pressure are made accurately to conform in shape to said matrices and are electrically welded at said edges.

4. The method of welding a concavo, convex body to a second body, which consists in seating said body in a matrix formed in the surface of a welding electrode, the said matrix corresponding in configuration to said body, in which matrix said body is free to tilt or nutate, applying pressure to force said bodies together, and thereby causing said body to adjust itself in said matrix to bring the welding edge of said body everywhere into contact with said second body, and establishing welding current through the joint between said bodies.

5. The method of welding two concavo, convex bodies, which consists in seating said bodies in matrices formed in the surfaces of the welding electrodes, the said matrices corresponding in configuration to said bodies, in which matrices said bodies are free to tilt or nutate, applying pressure to force said bodies together, and thereby causing said bodies to adjust themselves in said matrices to bring the welding joint at their contacting edges into a plane transverse to the direction of pressure, and establishing welding current to said contacting edges.

6. The method of making hollow balls or globes, which consists in, first, striking up, stamping or pressing from sheet metal two hemispheres, each having on its edge an annular extension; second, placing said hemispheres in hemispherical matrices formed in electrodes having flat opposing faces surrounding said matrices, with said annular extensions in contact; third, pressing said electrodes together and establishing the welding current until the said flat faces of said electrodes meet, whereby the metal of said extensions is substantially melted and taken up and the joint formed.

In testimony whereof we have affixed our signatures in presence of two witnesses.

THOMAS E. MURRAY.
HARRY R. WOODROW.

Witnesses:
GERTRUDE T. PORTER,
MAY T. McGARRY.